(12) United States Patent
Maertens et al.

(10) Patent No.: US 10,086,884 B2
(45) Date of Patent: Oct. 2, 2018

(54) TRAILER TAILGATE STABILIZING MECHANISM

(71) Applicant: TITAN TRAILERS INC., Delhi (CA)

(72) Inventors: Andrew Joseph Maertens, Delhi (CA); Michael Kloepfer, Delhi (CA)

(73) Assignee: Titan Trailers Inc., Delhi (CA)

( * ) Notice: Subject to any disclaimer, the term of this patent is extended or adjusted under 35 U.S.C. 154(b) by 0 days.

(21) Appl. No.: 15/551,166

(22) PCT Filed: May 13, 2015

(86) PCT No.: PCT/CA2015/050435
§ 371 (c)(1),
(2) Date: Aug. 15, 2017

(87) PCT Pub. No.: WO2016/179678
PCT Pub. Date: Nov. 17, 2016

(65) Prior Publication Data
US 2018/0022399 A1 Jan. 25, 2018

(51) Int. Cl.
*B62D 33/037* (2006.01)
*B62D 33/027* (2006.01)
(Continued)

(52) U.S. Cl.
CPC ............ *B62D 33/037* (2013.01); *B60P 1/26* (2013.01); *B62D 33/0273* (2013.01);
(Continued)

(58) Field of Classification Search
CPC .. B62D 33/037; B62D 33/023; B62D 33/027; B62D 33/0273; B62D 33/03; B60P 1/26; E05F 5/02; E05F 7/04
See application file for complete search history.

(56) References Cited

U.S. PATENT DOCUMENTS 1,766,183 A   6/1930   Mealia
2,504,326 A * 4/1950   Grilley ............... B62D 33/0273
                                                        296/53
(Continued)

FOREIGN PATENT DOCUMENTS

KR     2017049229 A * 5/2017

OTHER PUBLICATIONS

International Patent Application No. PCT/CA2015/050435, International Preliminary Report dated Apr. 20, 2017.
(Continued)

*Primary Examiner* — Hilary L Gutman
(74) *Attorney, Agent, or Firm* — Borden Ladner Gervais LLP

(57) ABSTRACT

A trailer may include a tailgate stabilizing mechanism to reduce movement of the tailgate during transport in order to reduce wear and tear. A knob is mounted at or near an edge of the tailgate. A cup which may be mounted at or formed in a mating gusset, bracket, or flange, is sized and shaped fittingly to receive the knob. The mating gusset, bracket, or flange is mounted to the container and positioned to receive the knob in the cup when the tailgate is closed. A locking mechanism may be configured to press on the tailgate when closed so as to compress the knob in the cup to reduce further movement of the tailgate. The knob may be removable and replaceable, and thus may be replaced following wear and tear of the knob.

37 Claims, 9 Drawing Sheets

(51) Int. Cl.
  *B62D 63/08* (2006.01)
  *E05F 7/04* (2006.01)
  *B60P 1/26* (2006.01)

(52) U.S. Cl.
  CPC .............. *B62D 63/08* (2013.01); *E05F 7/04* (2013.01); *E05Y 2900/516* (2013.01)

(56) References Cited

U.S. PATENT DOCUMENTS

| | | | |
|---|---|---|---|
| 3,784,243 | A | 1/1974 | Pastva, Jr. |
| 5,791,723 | A * | 8/1998 | Bell ............................ B60J 5/06 |
| | | | 16/86 B |
| 6,039,389 | A * | 3/2000 | Monette ................... B60J 5/101 |
| | | | 296/207 |
| 6,206,455 | B1 * | 3/2001 | Faubert ...................... B60J 5/06 |
| | | | 16/86 B |
| 6,247,744 | B1 * | 6/2001 | Townsend ............ E05D 11/0027 |
| | | | 16/388 |
| 6,401,396 | B1 * | 6/2002 | Koban ...................... E05F 5/00 |
| | | | 16/85 |
| 6,550,838 | B2 | 4/2003 | Bobbitt, III et al. |
| 7,228,595 | B2 | 6/2007 | Tudora et al. |
| 7,308,731 | B2 * | 12/2007 | Schubring ............... E05F 5/022 |
| | | | 16/86 R |
| 8,235,453 | B2 * | 8/2012 | Hull, Jr. .................. E05D 15/10 |
| | | | 296/146.9 |
| 2002/0153739 | A1 * | 10/2002 | Brzenchek ........... B62D 33/023 |
| | | | 296/57.1 |
| 2005/0060867 | A1 * | 3/2005 | Schubring .................. B60J 5/10 |
| | | | 29/525.11 |
| 2006/0097550 | A1 * | 5/2006 | Wang ..................... E05F 5/022 |
| | | | 296/207 |
| 2006/0202500 | A1 * | 9/2006 | Eschebach ......... B62D 33/0273 |
| | | | 296/57.1 |
| 2006/0220410 | A1 * | 10/2006 | Luehr ..................... B60J 5/108 |
| | | | 296/61 |
| 2014/0150207 | A1 * | 6/2014 | Hattori ................... E05F 5/022 |
| | | | 16/82 |

OTHER PUBLICATIONS

International Patent Application No. PCT/CA2015/050435, International Search Report and Written Opinion dated Feb. 8, 2016.

* cited by examiner

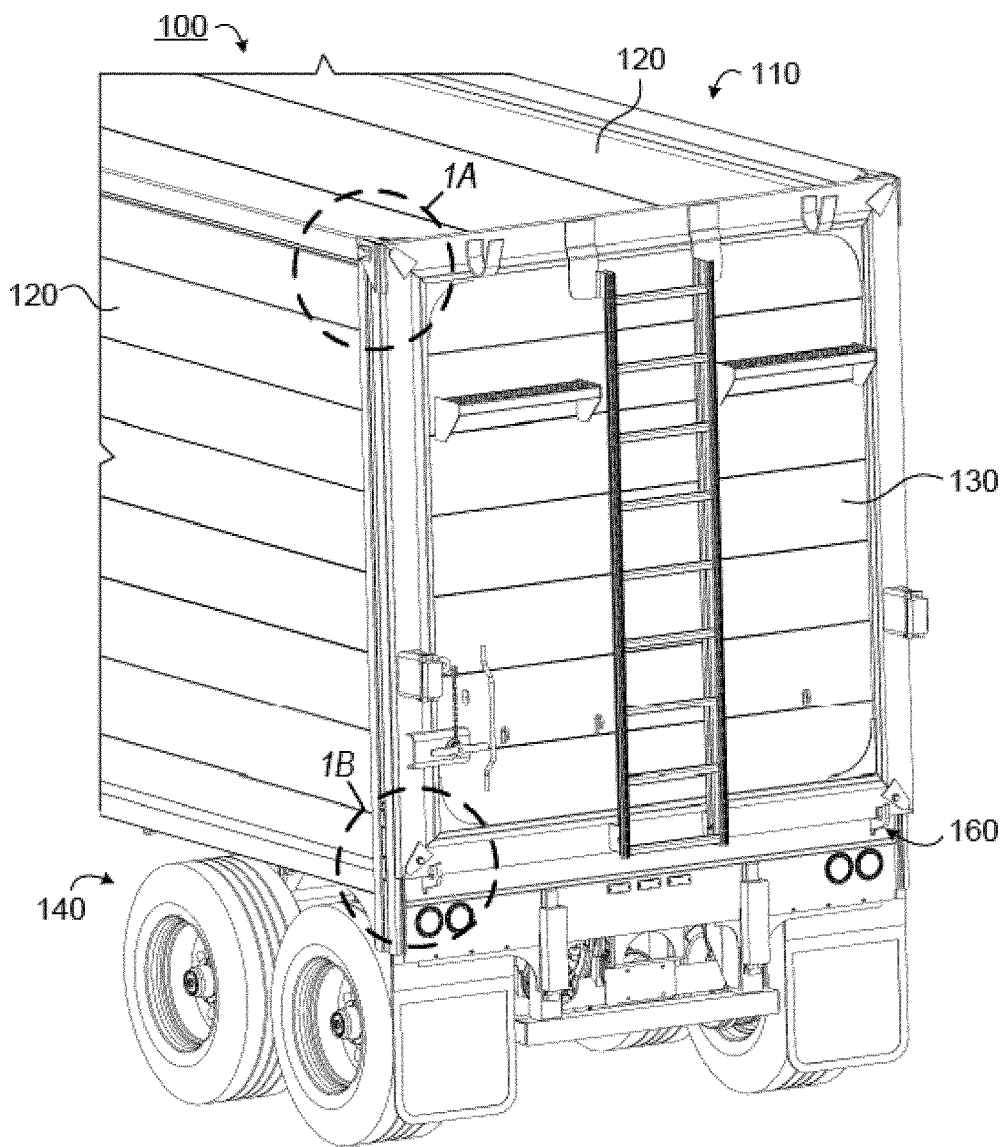
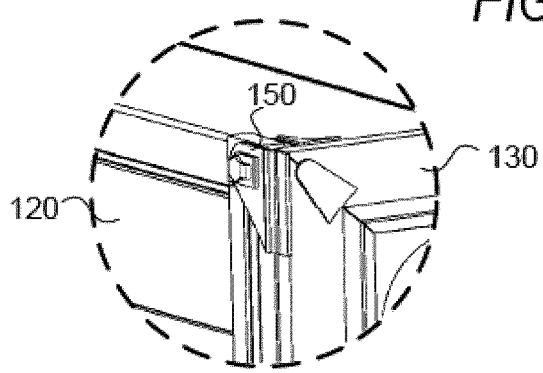
FIG. 1
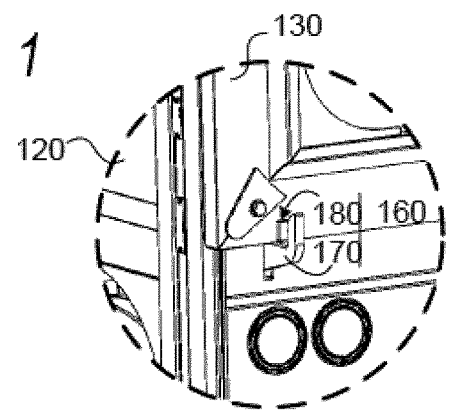
FIG. 1A
FIG. 1B

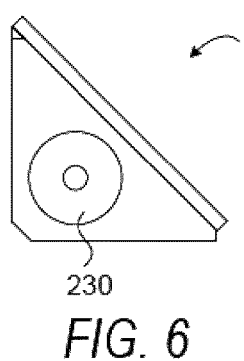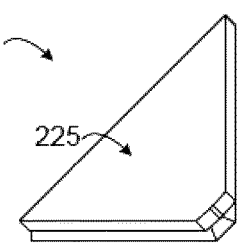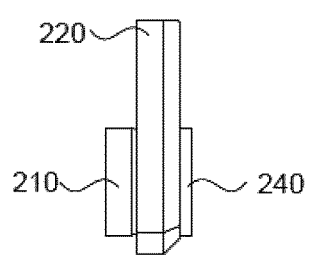
FIG. 6　　　　FIG. 7　　　　FIG. 8
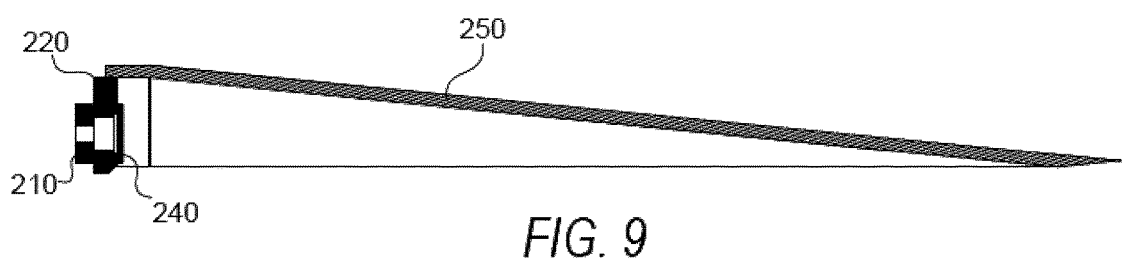
FIG. 9

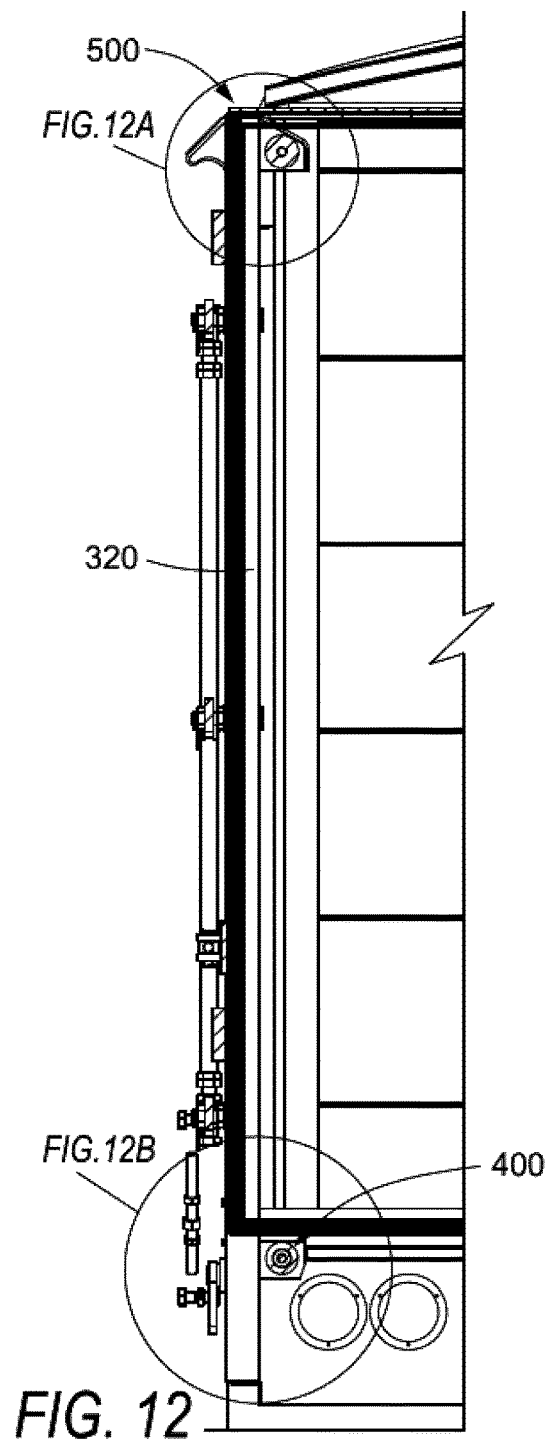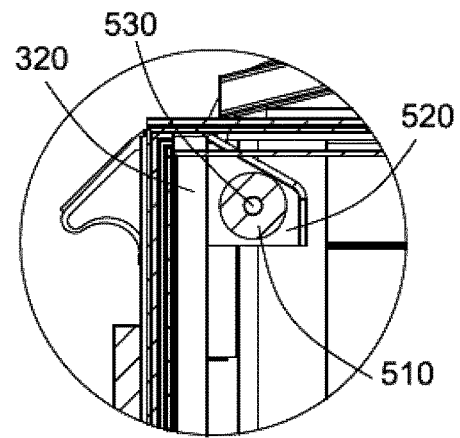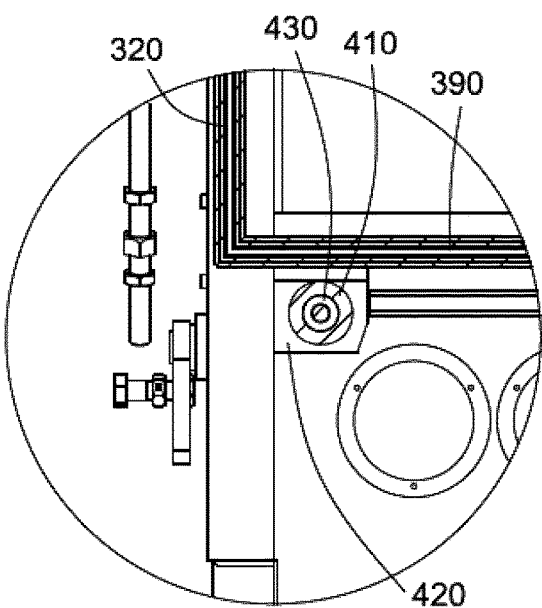

TRAILER TAILGATE STABILIZING MECHANISM

FIELD

The present disclosure relates generally to trailers.

BACKGROUND

Trailers are widely used to transport various materials. For example, tipper trailers and walking floor trailers are widely used to transport particulate bulk material such as gravel, stone, grain, and road salt. Dump trailers are also used for transporting such material, as well as other material such as garbage.

A typical tipper trailer, for example, employs some lifting means, such as hydraulics, to 'tip' a container of the trailer, that is to raise a forward end of a container of the trailer, nearest a trailer hitch or other means for coupling to a towing tractor, relative to a rear end of the trailer. In this way, a floor of the container is made to slope thereby to urge the bulk material to slide or roll out of a back opening of the container. A tailgate is typically provided to close the back opening to retain the bulk material during transport. The tailgate is typically mounted to the container at or near an upper end of the tailgate by means of some mounting mechanism such as hinges. When the container is tipped, the tailgate swings open by force of gravity thereby allowing the bulk material to empty through the back opening of the container. During transport the tailgate is typically held shut by a locking mechanism provided at or near a bottom of the tailgate. For example, the trailer may be provided with one or more moveable latches just below a bottom edge of the tailgate which in a closed position hold the tailgate shut.

Walking floor trailers and dump trailers also typically have tailgates mounted at and upper or side edge of the tailgate, with locking mechanisms to hold the tailgate closed during transport.

One problem with the design of typical trailers is that the mounting mechanism, such as hinges, by which the tailgate is mounted to the container allows for some amount of movement and of the tailgate during transport, including in a plane of the tailgate. As such, the tailgate tends to jostle and grind against other components such as the surfaces of the hinges and the locking mechanism. Over time such grinding causes wear and damage to the components which must eventually be repaired or replaced.

There is a material value, therefore, in techniques which limit the movement of a trailer tailgate during transport thereby to minimize wear and damage to cooperating components of the trailer such as mounting hinges and locking mechanisms.

SUMMARY

A trailer may include a tailgate stabilizing mechanism to reduce movement of the tailgate in a plane of the tailgate during transport in order to reduce wear and tear. The tailgate stabilizing mechanism may include a knob mounted to one of the tailgate or the sidewall at or near an edge of the tailgate. For example, the knob may be mounted at an inside-facing surface of the tailgate and positioned adjacent a junction of an inside-facing surface of a sidewall and an inside-facing surface of a floor when the tailgate is closed. The tailgate stabilizing mechanism may also have a cup sized and shaped fittingly to receive the knob. The cup may be mounted and positioned to receive the knob in the cup when the tailgate is closed to reduce movement of the tailgate in a plane of the tailgate. For example, the cup may be mounted to or formed in a mating gusset which may be mounted at or near the junction. The mating gusset may be positioned to receive the knob in the cup when the tailgate is closed. A locking mechanism may be configured to press on the tailgate when closed so as to compress the knob in the cup to reduce further movement of the tailgate. The knob may be formed of a resilient, compressible material, and the mating gusset may be formed of a resilient, rigid material. The knob may be removable and replaceable, and thus may be replaced following wear and tear of the knob.

The tailgate stabilizing mechanism may be provided as a kit for installation in an existing trailer.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures.

FIG. 1 is a partial perspective outside view of a rear end of a trailer having a top-mounted tailgate. FIG. 1A is a detail view showing a swivel hinge. FIG. 1B is a detail view showing a finger latch.

FIG. 6 is an end view of a mating gusset illustrating a cup thereof.

FIG. 7 is an end view of a mating gusset illustrating a closed end thereof.

FIG. 8. is a side view of a knob, mating gusset, and cap assembled.

FIG. 9 is a longitudinal cross-sectional view of a tailgate stabilizing mechanism including shedder.

FIG. 12 is a partial, rear, cross-sectional view of the trailer of FIG. 10. FIG. 12A is a detail view showing a top-mounted tailgate stabilizer mechanism. FIG. 12B is a detail view showing a bottom-mounted tailgate stabilizer mechanism.

DETAILED DESCRIPTION

Figure 2:
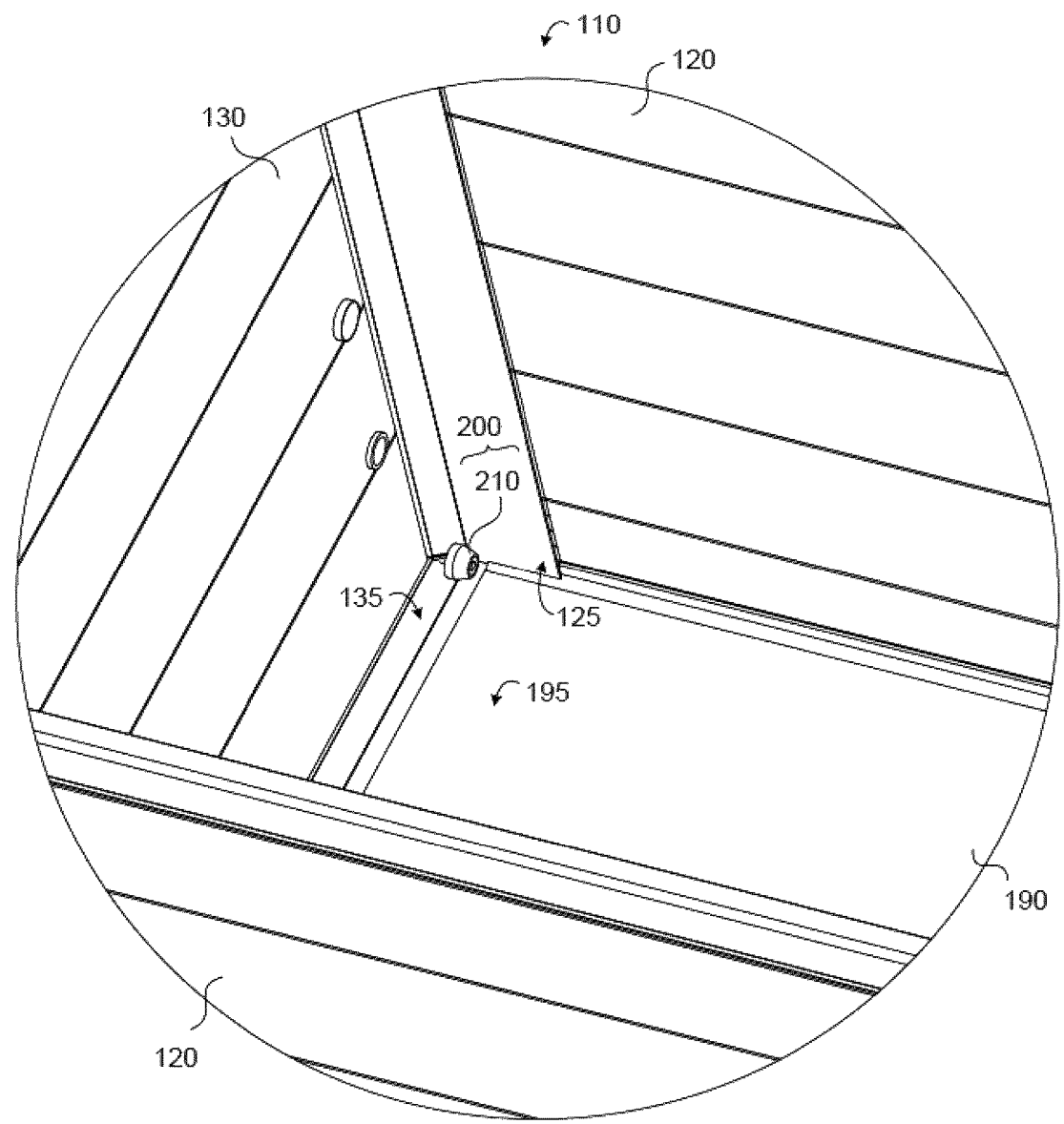
FIG. 2 is a partial perspective inside view of the trailer showing a knob of a tailgate stabilizing mechanism, wherein the knob is mounted to a tailgate of the trailer.

A trailer 100 having a trailer tailgate stabilizer, and a trailer tailgate stabilizer kit, are described with reference to the drawings.

FIG. 1 shows a rear perspective view of and back portion of the trailer 100. In general, the trailer 100 may be any sort of trailer, such as a tipper trailer, a walking floor trailer, or a dump trailer. The principles set forth herein may be applied to such different types of trailers, and yet others, taking into account the particular qualities of the type of trailer.

The trailer has a container 110 with an open top, and sidewalls 120 and a tailgate 130 mounted to the container 110 at or near an upper end of the tailgate 130. The trailer 100 may have other typical components as are known in the art, such as a front wall (not shown), a hitch or other coupler (not shown) for coupling to a tractor (not shown), a chassis (not shown), and a wheeled suspension 140.

As shown in FIG. 1, and particularly in FIG. 1A, the tailgate 130 may be mounted to the container 110 using swivel hinges 150 or by any other suitable mechanism. For example, the tailgate may be mounted using hinges, such as a piano hinge, joining a top edge of the tailgate and an adjacent edge of a top surface or rail of the container. Alternatives are possible. Alternatively, and as described below, the tailgate may be mounted to the container by hinges along a side edge of the tailgate.

The tailgate 130 is shown in FIG. 1 in a closed and locked configuration. The trailer 100 also has a locking mechanism 160 for locking the tailgate 130 in the locked configured. As shown in FIG. 1, and particularly in FIG. 1B, the locking mechanism 160 may include one or more moveable finger latches 170. As best seen in FIG. 1B, a latch seat 180 may be mounted to an outside surface of the tailgate 130 facing an inside surface of each finger latch 170 such that, when the tailgate 130 is dosed and the finger latch 170 is in a locking position, the inside surface of the finger latch 170 faces an opposing surface of the latch seat 180, and is either slightly spaced from or contacts the opposing surface of the latch seat 180. In the raised, locking position shown in FIG. 1B, the finger latches 170 effectively prevent opening of the tailgate 130. The finger latches 170 may also be lowered into an unlocked position so as to permit passage of the bottom of the tailgate 130 past the finger latches 170, such that the tailgate 130 may be opened. Alternative locking mechanisms may also be used, and finger latches and latch seats are shown only by way of example.

When the trailer 100 is a tipper trailer, it may also include a mechanism for tipping the container (not shown), that is to raise a front end of the container 110 relative to a back end of the container 110, so as to make a floor of the container 110 to slope. If the tailgate 130 is in the unlocked configuration—that is, the finger latches 170 are lowered in the unlocked position—then the tailgate 130 is free to swing open under the force of gravity, thereby making an opening at the rear end of the container 110 allowing any particulate bulk material, or other contents, carried in the container 110 to roll or slide out of the opening past the tailgate 130.

The trailer 100 has a tailgate stabilizing mechanism 200, or simply tailgate stabilizer, to minimize movement of the tailgate 130, including movement in a plane of the tailgate 130 when it is in the locked configuration.

FIGS. 2 to 5 show partial views of an inside of the container 110 of the trailer from a point of view above the container 110 and looking downwardly at a junction of an inside-facing surface 135 of the tailgate 130, an inside-facing surface 125 of an adjacent sidewall 120 of the container 110, and an inside-facing surface 195 of the floor of the container 110. Specifically, FIGS. 2 to 5 show the tailgate stabilizing mechanism 200 in various states of assembly and installation. While the tailgate stabilizing mechanism 200 is shown mounted in a left rear corner of the container 110, it may alternatively be mounted only in the left rear corner of the container 110, only in an opposite right rear corner of the container 110, or further alternatively in both the left and right rear corners.

As shown in FIG. 2, the tailgate stabilizing mechanism 200 may include a knob 210 mounted to the inside-facing surface 135 of the tailgate 130 at or near a junction of the inside-facing surface 125 of the sidewall 120 and the inside-facing surface 195 of the floor 190. The knob 210 may be shaped so as to taper to a smaller cross-sectional size as it extends inwardly along its length into the container 110, as shown in FIG. 2, or it may have the same cross-sectional size along a part or the entire of its length. The knob 210 may be conical as shown in FIG. 2, or it may have any other suitable shape, and for example may have a square, triangular, hexagonal, or star-shaped cross-section. The knob 210 may be formed of any suitable material including by way of example only, and without limitation, steel, stainless steel, aluminum, ultra-high-molecular-weight polyethylene (UMHW), or composite materials. The knob 210 may be formed of a resilient material, and may also be formed of an at least partly compressible material. The knob 210 may be mounted to the tailgate 130 by any suitable means including by way of example only, and without limitation, fasteners including one or more bolts or screws, lock nuts, or stitch welds. The knob 210 may have a flanged surface in contact with the tailgate 130 to fasten the knob 210 to the tailgate 130 using a row or perimeter of bolts.

Figure 3:
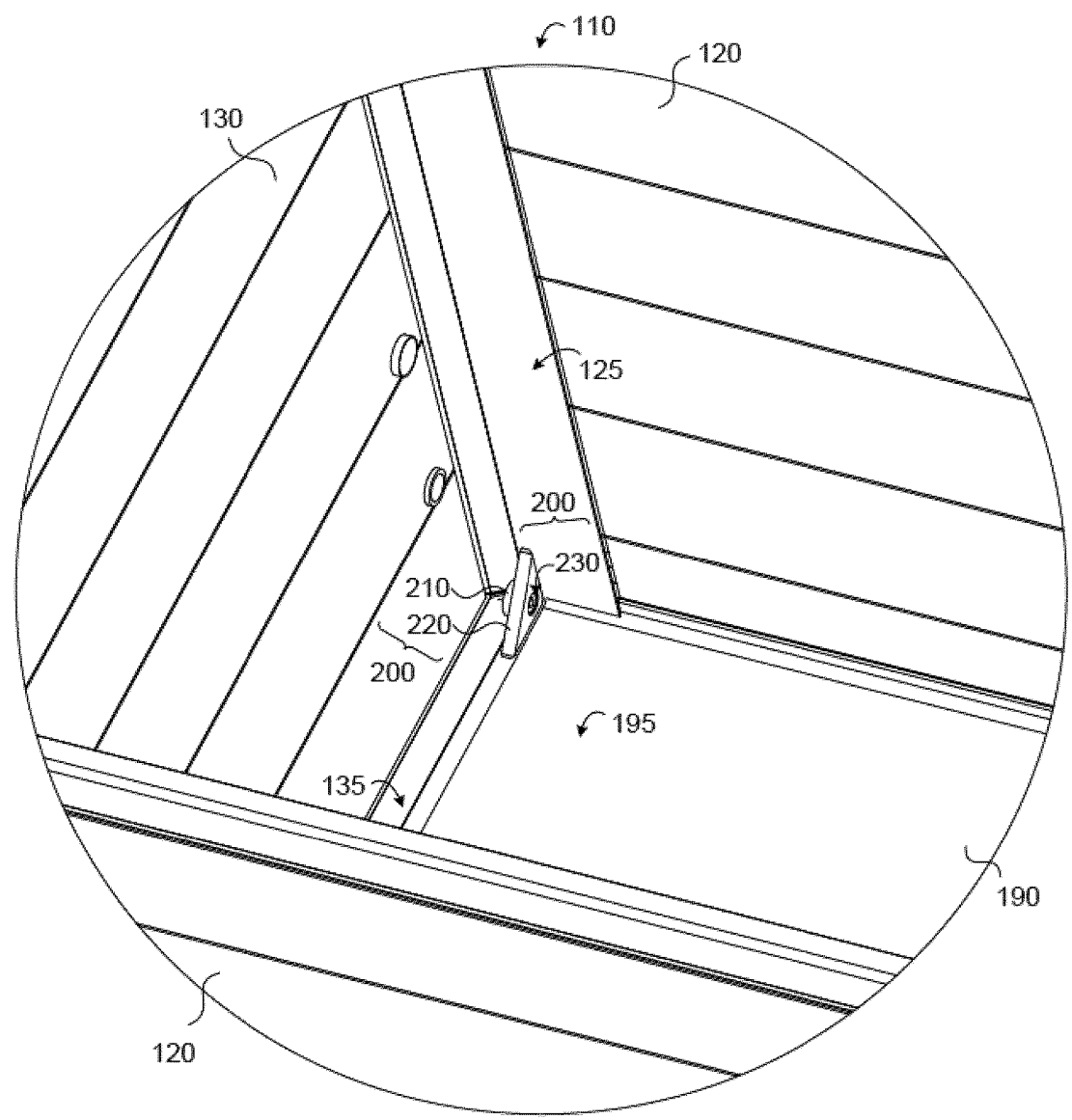
FIG. 3 is a partial perspective inside view of the trailer showing a knob and mating gusset of a tailgate stabilizing mechanism.

As shown in FIG. 3, a mating gusset 220 may be mounted at the junction between the inside-facing surface 195 of the floor 190 and the inside-facing surface 125 of the sidewall 120, so as to extend in a plane substantially perpendicular to both of the respective inside-facing surfaces 195, 125 of the floor 190 and sidewall 120. Although the mating gusset is shown to have a generally triangular shape, it may alternatively be provided in any suitable shape. The mating gusset may be formed of any suitable material including by way of example only, and without limitation, steel, stainless steel, aluminum, UMHW, or composite materials. The mating gusset 220 may be mounted by any suitable means such as fasteners including bolts, screw, or rivets, or may be welded to the inside-facing surface 125 of the sidewall 120 and/or the inside-facing surface 195 of the floor 190.

As shown especially in FIGS. 6 & 8, the mating gusset 220 is provided with a cup 230 sized and shaped for mating fit of the knob 210 in the cup 230. The cup 230 may have a size and shape which is an inverse of the knob 210, such that the knob 210 fits matingly in the cup 230. As such, when the knob 210 has a conical shape, the cup 230 may also have a conical shape. As shown in FIG. 7, the cup 230 may extend only partway through a thickness of the mating gusset 220 in the direction of extension of the knob 210 along its length and thus a face 225 of the mating gusset 220 opposite an opening of the cup 230 may be dosed; alternatively, as shown in FIG. 3 it may extend completely through the mating gusset 220 so as to form a hole. In such case, the knob 210 may enter the cup 230 at a rear opening facing the inside-facing surface 135 of the tailgate 130. The knob 210 have a length such that it extends only partway into the cup 230, as shown in FIG. 3, or a portion of the knob 210 may extend beyond a front opening of the cup 230 opposite the rear opening, facing the front end of the container.

The mating gusset 220 is mounted to the inside-facing surfaces 125, 195 of the sidewall 120 and floor 190, and the knob 210 is mounted to the inside facing surface 135 of the tailgate 130, in such positions that when the tailgate 130 is closed the knob 210 is received into mating fit with the cup 230, wherein the knob 210 and the cup 230 are either in contact or are spaced slightly. As noted above, the cup 230 may traverse an entire thickness of the mating gusset 220 and so constitute a channel or hole, as shown in FIG. 3, or may alternatively pass only partway through the thickness of the mating gusset 220.

Figure 4:
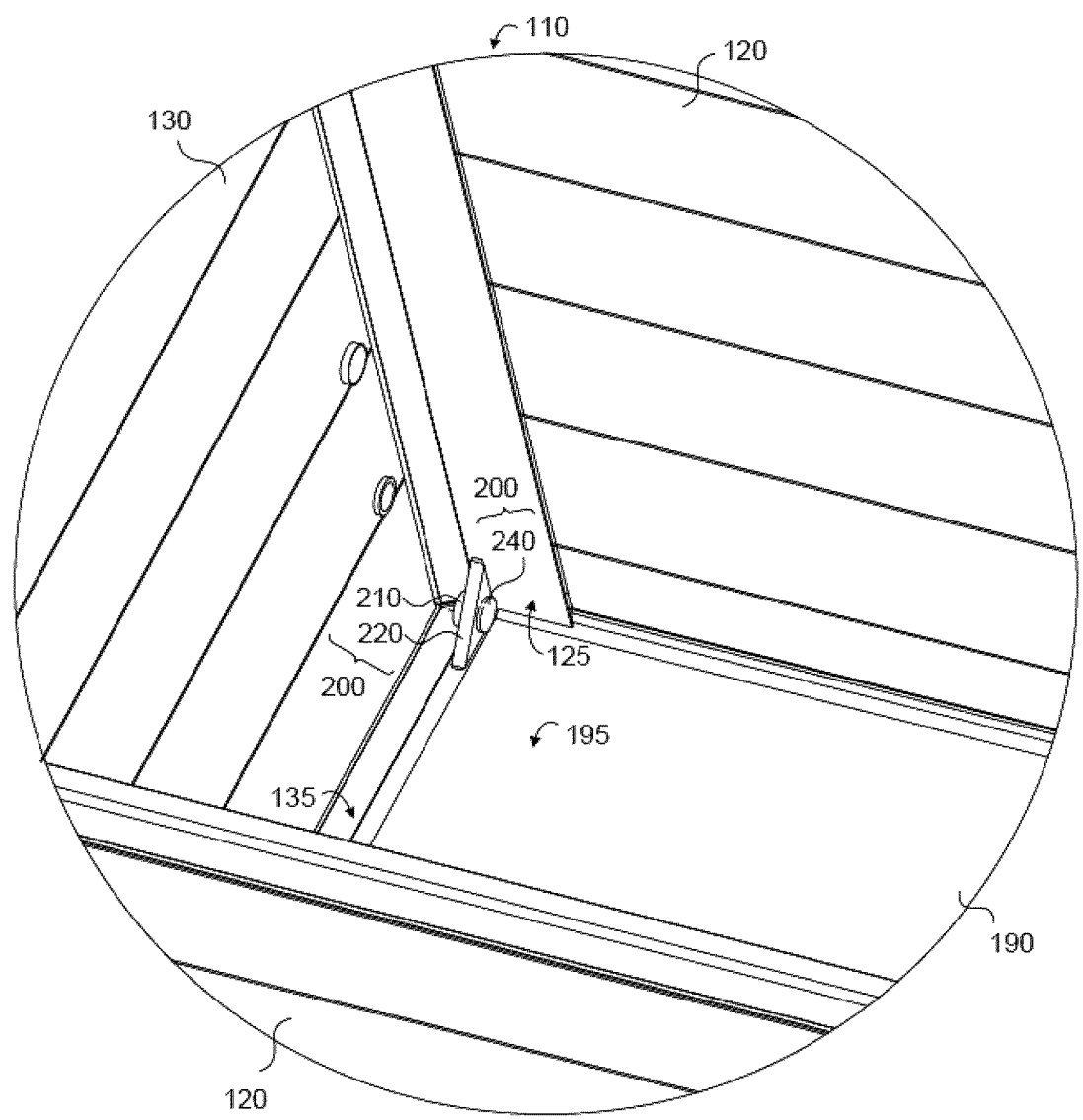
FIG. 4 is a partial perspective inside view of the trailer showing a knob, a mating gusset, and a cap of a tailgate stabilizing mechanism.

As shown especially in FIGS. 4 & 8, if the cup 230 traverses the entire thickness of the mating gusset 220, and so constitutes a channel or hole, the tailgate stabilizing mechanism 200 may optionally include a cap 240 to be received by an inside-facing opening of the cup 230 (not shown) thereby to cover and close that opening so as to prevent passage therein of bulk material as is slides or roils along the floor 190 when the container 110 is tipped for emptying the bulk material out of the back opening of the container 110.

Figure 5:
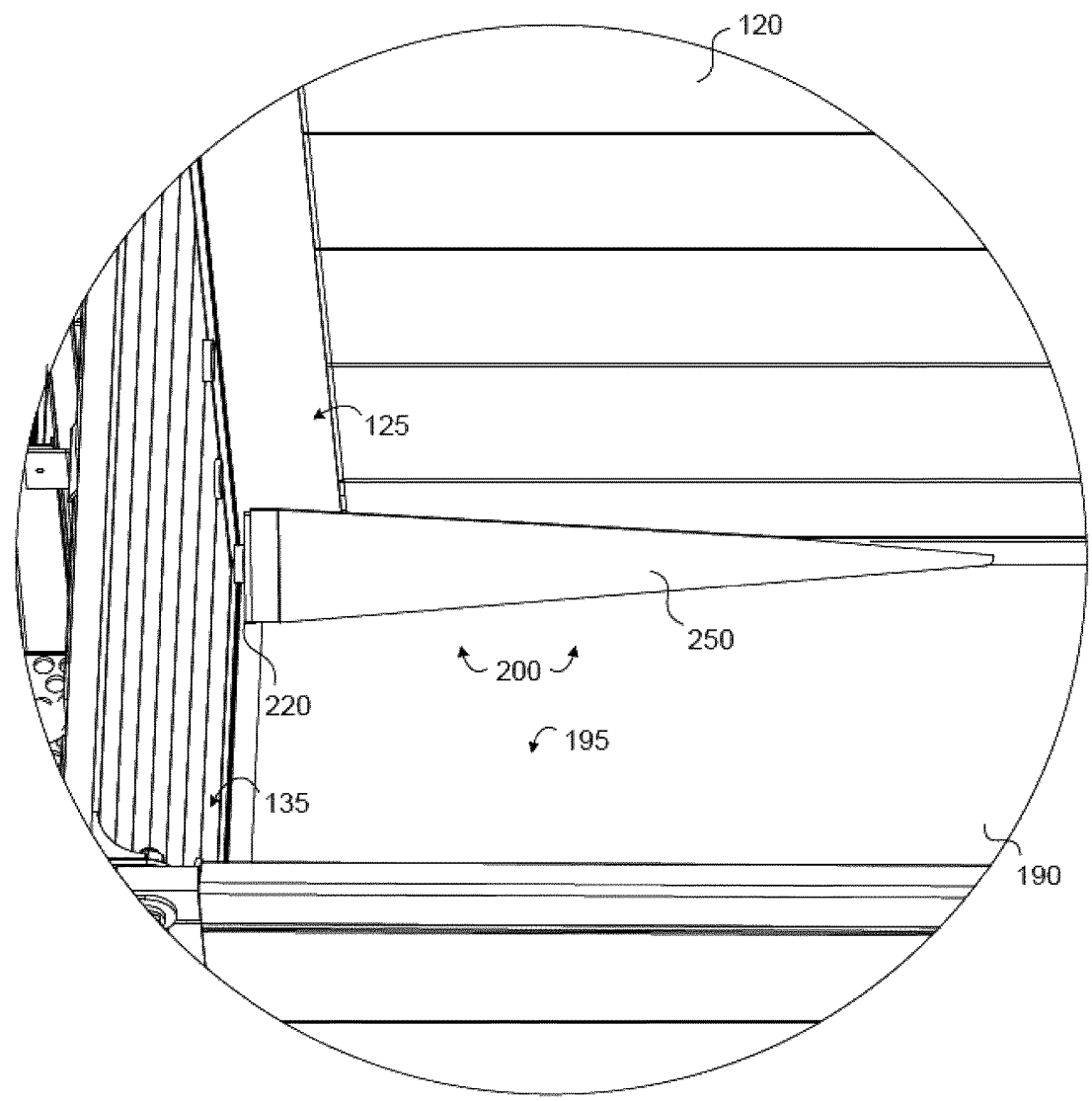
FIG. 5 is a partial perspective inside view of the trailer showing a knob, a mating gusset, and a shedder of a tailgate stabilizing mechanism.

As shown in FIGS. 5 & 9, the tailgate stabilizing mechanism 200 may also or alternatively include a shedder 250 which includes a sheet of rigid material, such as steel or aluminum, mounted at an inside-facing end of the mating gusset 220 and the respective inside-facing surfaces 125, 195 of the sidewall 120 and the floor 190. The sheet of rigid material may have the shape of a triangle, or any other suitable shape. The shedder 250 may span the respective inside-facing surfaces 125, 195 of the sidewall 120 and the floor 190, and a width of the shedder 250 may decrease as the shedder 250 extends along its length inwardly, while being mounted to the respective inside-facing surfaces 125, 195 of the sidewall 120 and the floor 190 in such a way as to maintain contact with corresponding adjacent edges of the shedder 250. In other words, the shedder 250 may be mounted at the respective inside-facing surfaces 125, 195 of the sidewall 120 and the floor 190, and at the mating gusset 220, so as to enclose a space defined by the respective inside-facing surfaces 125, 195 of the sidewall 120 and the floor 190, and the mating gusset 220. The shedder 250 may be mounted at respective edges of the shedder 250 to the respective inside-facing surfaces 125, 195 of the sidewall 120 and the floor 190 by any suitable means, for example by screws, bolts, rivets, or welds. The shedder 250 may further include integral with or attached to the sheet of rigid material means such as tabs, flanges, or the like for cooperating with the mounting means for mounting the shedder 250 as described.

In this way, the shedder 250 may function to divert, redirect, or 'shed' any bulk material passing toward the rear of the container 110, by the shedder 260, past the tailgate stabilizing mechanism 200 when the container 110 is tipped and bulk material rolls or slides toward the rear opening of the container 110. In particular, the shedder 260 may function to prevent bulk material from becoming caught behind the mating gusset 220, or passing into the cup 230 when it traverses the thickness of the mating gusset 220 to form a hole or channel.

When the tailgate 130 is in a closed configured, and the knob 210 is fittingly received in the cup 230, movement of the tailgate 130 in a plane of the tailgate 130 during transport is resisted, and thus reduced or minimized. In particular, the knob 210 may be formed of a resilient, but at least partly compressible material, and the locking mechanism 160 may be configured such that in the locking position, the locking mechanism 160 applies pressure to an outside surface of the tailgate 130 (or a cooperating device, such as the latch seat 180), thereby causing the knob 210 to press into the cup 230. Alternatively, the knob 210 may be coupled to such a resilient and compressible material, such as a spacer or washer sandwiched between the knob 210 and the tailgate 130, for such purpose. Although optional, providing such compressed contact of the knob 210 within the cup 230 may further reduce movement of the tailgate 130 in its plane. Such reduction in movement of the tailgate 130 may serve to reduce wear and tear associated with such movement to the tailgate 130, locking mechanism 160, such as finger latches 170 and latch seats 180, and also tailgate 130 mounting means such as swivel hinges 150.

Moreover, by providing the tailgate stabilizing mechanism 200 within the container 110 as shown, a height of the tailgate 130 may be limited such that a bottom edge of the tailgate 130 is at or just below an upward-facing surface 195 of the floor 190 of the container 110, as is typically the case in tipper trailers, for example. When the tailgate 130 ends or extends only slightly below the floor surface 195, there may be insufficient space to provide a knob and cup, or the like, in the tailgate 130 and rear-facing surface of the rear end of the container 110. The tailgate stabilizing mechanism 200 described above and shown in FIGS. 2-5 has the advantage, however, of being useful whether the tailgate 130 ends or extends only slightly below the floor surface 195, or alternatively much further below the floor surface 195.

As a yet further alternative, the tailgate stabilizing mechanism may be provided in the container with the positions of the knob and the cup reversed. Specifically, the knob may be mounted to a mounting gusset which is alike in all respects to the mating gusset except that it is not formed with the cup. Instead, the cup may be formed in the inside-facing surface of the tailgate at a location where the knob is mounted in the embodiments described above. Conversely, the knob, as noted above, may be mounted to the mounting gusset and extend rearward, toward the cup formed in the tailgate, instead of in the opposite direction as in the above embodiments. As in the embodiments described above, the knob and cup may be respectively sized, shaped, and positioned such that when the tailgate is closed, and may be in the locked configuration, the knob is fittingly received in the cup so as to reduce movement of the tailgate, including in the plane of the tailgate.

While the above embodiments concern specifically a top-mounted tailgate which extends just below a surface of the floor of the container, thus providing a particular advantage when a tailgate stabilizing mechanism is employed within the container as described, the principles set forth herein are also applicable to trailers with side-mounted tailgates, or tailgates which extend further below the floor of the container.

Figures 10, 10A:
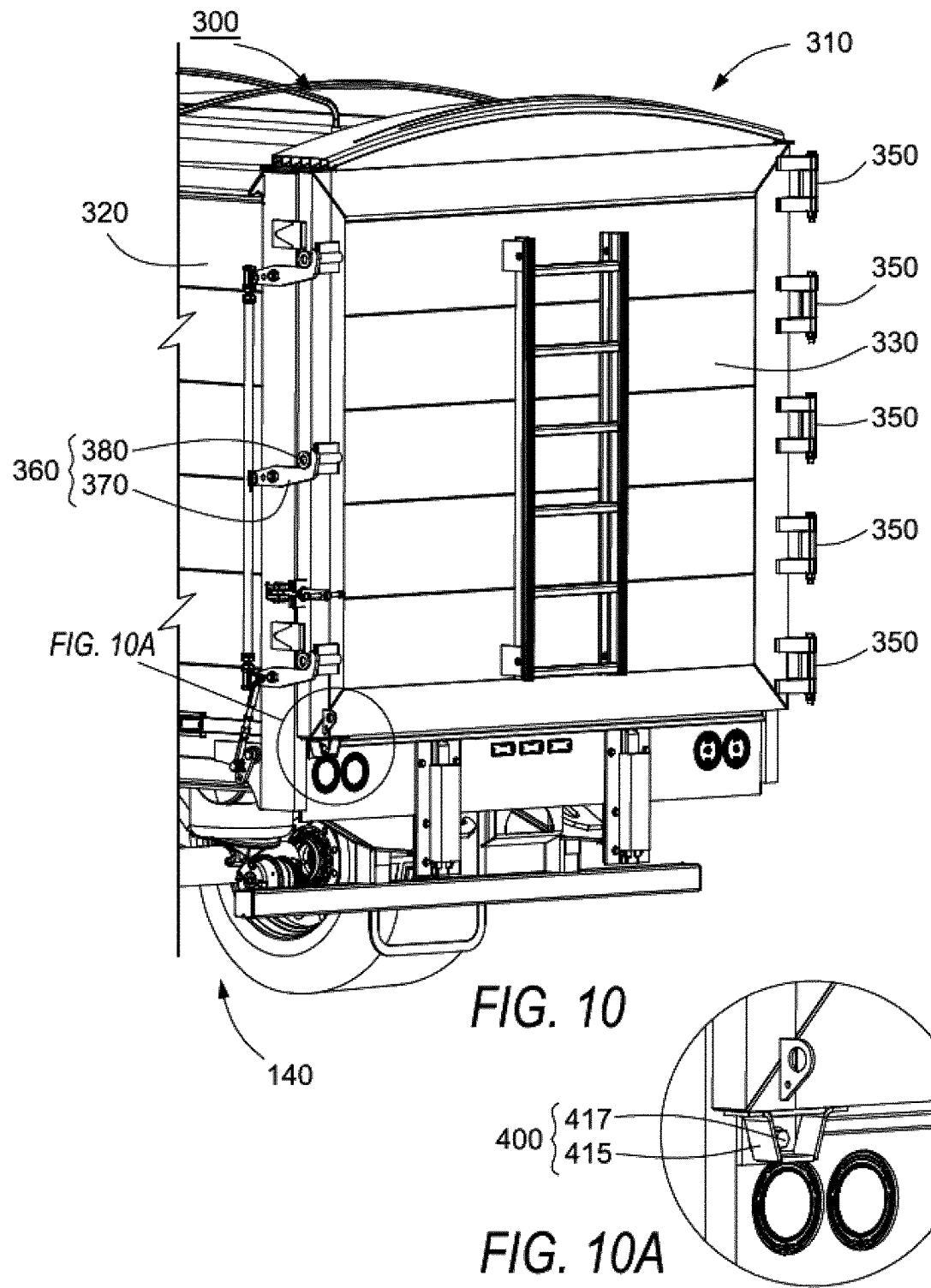
FIG. 10 is a partial perspective outside view of a rear end of a trailer having a side-mounted tailgate.
FIG. 10A is a detail view showing an outside mount of a tailgate stabilizer mechanism.
Figures 11, 11A, 11B:
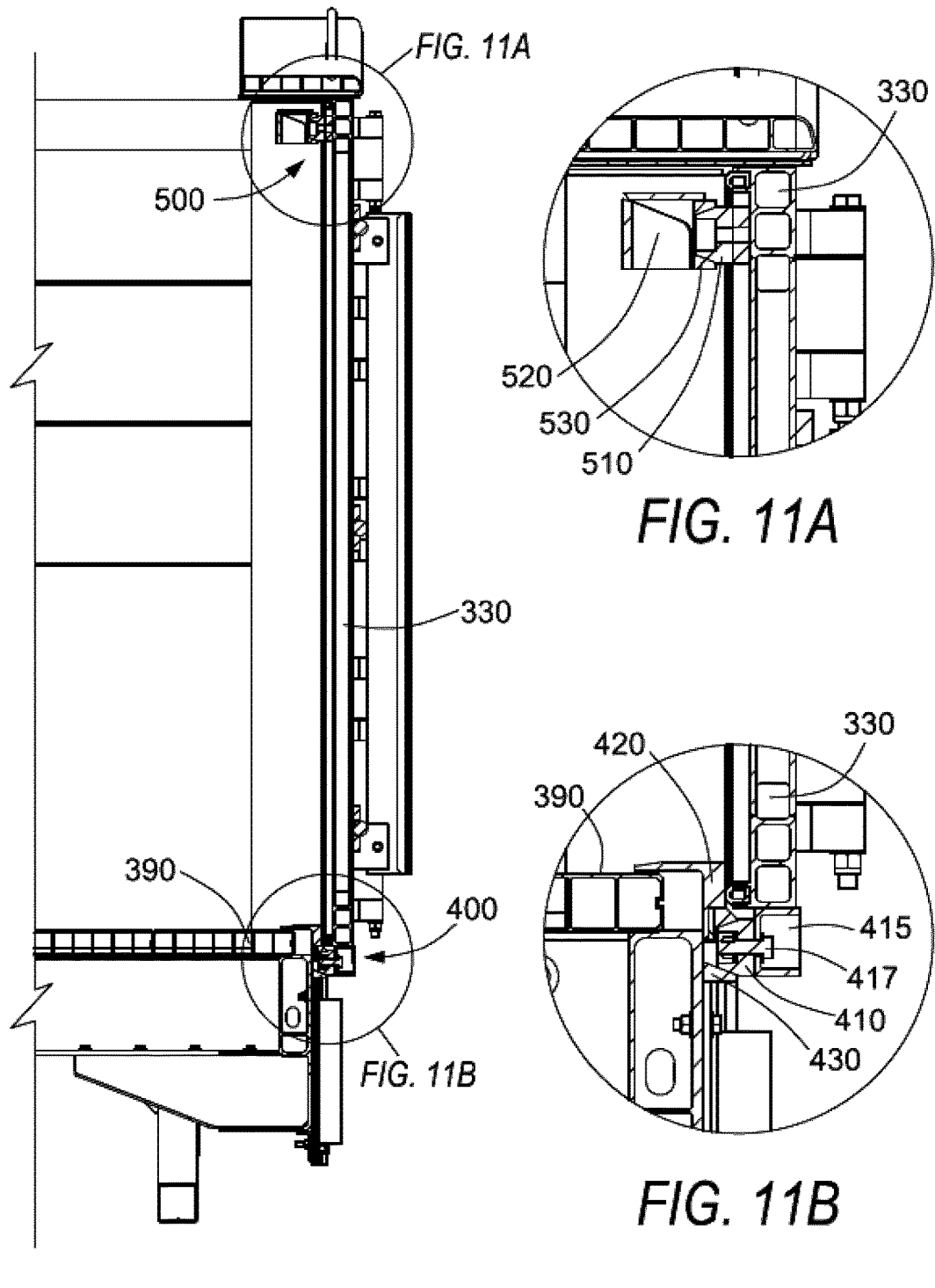
FIG. 11 is a partial, side, cross-sectional view of the trailer of FIG. 10.
FIG. 11A is a detail view showing a top-mounted tailgate stabilizer mechanism.
FIG. 11B is a detail view showing a bottom-mounted tailgate stabilizer mechanism.

Such a trailer 300 is shown in FIGS. 10-12. The trailer 300 in similar in many respects to the trailer 100 described above. It has a container 310 with an open top, sidewalls 320, and a tailgate 330. As with trailer 100, trailer 300 may have other typical components as are known in the art, such as a front wall (not shown), a hitch or other coupler (not shown) for coupling to a tractor (not shown), a chassis (not shown), and a wheeled suspension 140.

In contrast to tailgate 130 described above, tailgate 330 is mounted to the container 310 at a side edge of the tailgate 330 using hinges 350, or another suitable mechanism. Thus, tailgate 330 opens to the side. The tailgate 330 is shown in FIG. 10 in a closed and locked configuration, and trailer 300 has a locking mechanism 360 for locking the tailgate 330 in the locked configured. Similar to locking mechanism 160, locking mechanism 360 may have a finger latch 370 and latch seat 380 for engagement by the finger latch 370. In this embodiment of the locking mechanism 360, the latch seat 380 may take the form of a bar or post which is cupped by the finger latch 370 when the finger latch 370 is in the locking configuration, to prevent movement of the bar or post past the finger latch 370, thereby holding the tailgate 330 closed. As shown, one or more such locking mechanisms 360 may be provided along an edge of the tailgate 330 opposite the edge at which the tailgate 330 is mounted to the 310 by means of hinges 350.

The trailer 300 has a tailgate stabilizing mechanisms 400, 500 similar to tailgate stabilizing mechanism 200, to minimize movement of the tailgate 330, including movement in a plane of the tailgate 330 when it is in the locked configuration.

With reference to FIGS. 10-12, tailgate stabilizing mechanism 400 may have a knob 410 and a cup 430, similar to the knob 210 and cup 230 of tailgate stabilizing mechanism 200. As shown especially in FIG. 10, the knob 410 may be mounted below a bottom edge of the tailgate 330 by means of a knob bracket 415. The knob 410 may be affixed to the knob bracket by means of a fastener 417 such as a bolt or screw. As shown especially in FIG. 11B, the knob 410 is received by the cup 430, which in this embodiment may be formed in a rear surface of the container 310 opposite the knob 410. Alternatively, the cup 430 may be mounted to or provided in a mating bracket 420 mounted at the rear surface of the container 310, which may also form an L-shape for mounting at a corner of the rear surface of the container 310 and a floor 390 of the container 310. By mounting the tailgate stabilizing mechanism 400 outside of the container 310, the collection of material by the tailgate stabilizing mechanism 400 may be avoided or minimized.

As shown in FIGS. 11-12, a tailgate stabilizing mechanism 500 may be similar to tailgate stabilizing mechanism 200, except configured for mounting near a top corner of the tailgate 330. Similar to the other embodiments, tailgate stabilizing mechanism 500 has a knob 510 mounted to the tailgate 330 by means of a fastener 517, and a cup 530 sized and shaped fittingly to receive the knob 510. As best seen in FIG. 12A, the cup 530 may be provided in a mating flange 520 similar to mating gusset 220, and is mounted and positioned on an inside surface of the sidewall 320 such that cup 530 is aligned fittingly to receive the knob 510 when the tailgate 330 is closed. Advantageously, the tailgate stabilizing mechanism 500 may be mounted anywhere along the height of the tailgate, and is not restricted to be mounted near the top corner of the tailgate 330.

Advantageously, all of the different embodiments of the tailgate stabilizing mechanism 200, 400, 500 may be used individually, or in combination, in any trailer.

In view of such flexibility of use of the tailgate stabilizing mechanism 200, it may advantageously be provided as a kit for installation in an existing trailer. In such case, the tailgate stabilizing mechanism 200, 400, 500 may include the knob 210, 410, 510 configured to be mounted on an inside-facing surface of a tailgate, a corresponding mating gusset 220, mating bracket 420, or mating flange 520, as the case may be, formed with a cup 230, 430, 530 as described above configured to be mounted in a container as described above, and optionally either or both of the cap 240 and the shedder 250 to be mounted or installed as described above. The kit may include a container for containing the foregoing components, and may also include directions, such as printed directions, for their proper installation, which may include an address such as a universal resource locator (URL) for accessing such directions via the Internet.

While the tailgate stabilizing mechanism has been described above to be used in a trailer, and possesses the advantages described above when put to such use, it is also useful in trailers other than trailers. In general, the tailgate stabilizing mechanism is useful in any situation where a tailgate may move in a plane of the tailgate during motion of the trailer, and it is desired to reduce such movement, which may have the purpose of reducing wear and tear to the tailgate and cooperating components of the trailer such as hinges or locking mechanisms.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A trailer comprising:
   a container for carrying bulk material, the container comprising a sidewall and a floor;
   a tailgate mounted to the container; and
   a tailgate stabilizing mechanism comprising:
   a knob mounted to one of the tailgate or the sidewall at or near an edge of the tailgate; and
   a cup sized and shaped fittingly to receive the knob, and mounted and positioned to receive the knob in the cup when the tailgate is closed to reduce movement of the tailgate in a plane of the tailgate;
   wherein: the knob is mounted at an inside-facing surface of the tailgate and positioned adjacent a junction of an inside-facing surface of the sidewall and an inside-facing surface of the floor when the tailgate is closed; and the tailgate stabilizing mechanism comprises a mating gusset comprising the cup, wherein the mating gusset is mounted at the inside-facing surface of the sidewall and the inside-facing surface of the floor, and is positioned to receive the knob in the cup when tailgate is closed.

2. The trailer according to claim 1, further comprising:
   a shedder comprising a flat sheet of material mounted in the container to deflect past the mating gusset bulk material moving toward a rear opening of the container.

3. The trailer according to claim 2, wherein the shedder has a triangular shape and a width of the shedder decreases along a length of the shedder extending away from the mating gusset.

4. The trailer according to claim 3, wherein the shedder is formed of aluminum sheet material.

5. The trailer according to claim 1, wherein the cup forms a channel traversing a thickness of the mating gusset, and the trailer further comprises:
   a cap covering a forward opening of the channel opposite a rearward opening that receives the knob, the cap blocking passage of bulk material into the channel.

6. The trailer according to claim 1, wherein the knob has a conical shape, and the cup has a matching conical shape.

7. The trailer according to claim 1, wherein the knob is mounted to the tailgate using a bolt or screw.

8. The trailer according to claim 1, wherein the knob is formed of a resilient and compressible material.

9. The trailer according to claim 1, wherein the tailgate is mounted to the container at upper corners of the tailgate using swivel hinges.

10. The trailer according to claim 1, wherein the trailer is a tipper trailer, a moving floor trailer, or a dump trailer.

11. The trailer according to claim 1, wherein the knob and cup are respectively positioned so as to compress the knob in the cup when the tailgate is closed to reduce movement of the tailgate.

12. The trailer according to claims 1, wherein the knob contacts the cup at side surfaces of the knob to reduce horizontal movement of the knob, to reduce horizontal movement of the tailgate in the plane of the tailgate.

13. The trailer according to claim 1, wherein the knob contacts the cup at upper and lower surfaces of the knob to reduce vertical movement of the knob, to reduce vertical movement of the tailgate in the plane of the tailgate.

14. The trailer according to claim 1, wherein:
the knob contacts the cup at side surfaces of the knob to reduce horizontal movement of the knob, to reduce horizontal movement of the tailgate in the plane of the tailgate; and/or
the knob contacts the cup at upper and lower surfaces of the knob to reduce vertical movement of the knob, to reduce vertical movement of the tailgate in the plane of the tailgate; and
the knob contacts the cup about a boundary of the knob in a plane normal to an axis of insertion of the knob into the cup.

15. The trailer according to claim 14, wherein the knob contacts the cup at side portions of the boundary of the knob to reduce horizontal movement of the knob in the plane normal to the axis of insertion, to reduce horizontal movement of the tailgate in the plane of the tailgate.

16. The trailer according to claim 14, wherein the knob contacts the cup at upper and lower portions of the boundary of the knob to reduce vertical movement of the knob in the plane normal to the axis of insertion, to reduce vertical movement of the tailgate in the plane of the tailgate.

17. The trailer according to claim 14, wherein the knob contacts the cup about substantially an entirety of the boundary of the knob in the plane normal to the axis of insertion to reduce vertical and horizontal movement of the knob in the plane normal to the axis of insertion, to reduce vertical and horizontal movement of the tailgate in the plane of the tailgate.

18. The trailer according to claim 1, wherein the knob is mounted at an inside-facing surface of the tailgate.

19. The trailer according to claim 18, wherein the knob projects inwardly from the inside-facing surface of the tailgate.

20. A trailer comprising:
a container for carrying bulk material, the container comprising a sidewall and a floor:
a tailgate mounted to the container: and
a tailgate stabilizing mechanism comprising:
a knob mounted to one of the tailgate or the sidewall at or near an edge of the tailgate; and
a cup sized and shaped fittingly to receive the knob, and mounted and positioned to receive the knob in the cup when the tailgate is closed to reduce movement of the tailgate in a plane of the tailgate;
wherein: the tailgate stabilizing mechanism further comprises: a knob bracket mounted beneath a bottom edge of the tailgate, wherein the knob is mounted to the knob bracket to face a rear surface of the container adjacent an a rear opening of the container; and the cup is mounted at or formed in the rear surface of the container.

21. The trailer according to claim 20, wherein:
the tailgate stabilizing mechanism further comprises:
a mating bracket mounted at or near a corner of the floor and the rear surface, wherein the cup is mounted at or formed in the mating bracket.

22. The trailer according to claim 21, wherein the mating bracket is mounted at or formed in the rear surface of the container.

23. The trailer according to claim 21, wherein the mating bracket is positioned below the bottom edge of the tailgate.

24. The trailer according to claim 20, wherein the cup is formed in the rear surface of the container.

25. The trailer according to claim 20, wherein the knob bracket projects below the bottom edge of the tailgate, and the knob is positioned below the bottom edge of the tailgate.

26. The trailer according to claim 20, wherein the cup is positioned below the bottom edge of the tailgate.

27. The trailer according to claim 20, wherein the knob and the cup are each positioned below a height of the floor of the container.

28. A trailer comprising:
a container for carrying bulk material, the container comprising a sidewall and a floor:
a tailgate mounted to the container; and
a tailgate stabilizing mechanism comprising: a knob mounted to one of the tailgate or the sidewall at or near an edge of the tailgate; and
a cup sized and shaped fittingly to receive the knob, and mounted and positioned to receive the knob in the cup when the tailgate is closed to reduce movement of the tailgate in a plane of the tailgate:
wherein: the knob is mounted at an inside-facing surface of the tailgate and positioned adjacent a junction of an inside-facing surface of the sidewall and an inside-facing surface of the tailgate when the tailgate is closed; and the tailgate stabilizing mechanism comprises a mating flange comprising the cup, wherein the mating flange is mounted at inside-facing surface of the sidewall and is positioned to receive the knob in the cup when the tailgate is closed.

29. The trailer according to claim 28, wherein the knob and the mating flange are respectively mounted near a top corner of the tailgate.

30. A. tailgate stabilizer kit for use in a trailer comprising a container and a tailgate, the container comprising a sidewall and a floor, the tailgate stabilizer kit comprising:
a knob mountable at a surface of the tailgate at or near a corner of the tailgate; and
a mating gusset mountable at a surface of the container, the mating gusset comprising a cup sized and shaped fittingly to receive the knob when mounted to the tailgate to reduce movement of the tailgate in a plane of the tailgate.

31. The tailgate stabilizer kit according to claim 30 further comprising:
a shedder comprising a flat sheet of material mountable in the container to deflect past the mating gusset bulk material moving toward a rear opening of the container.

32. The tailgate stabilizer kit according to claim 31, wherein the shedder has a triangular shape.

33. The tailgate stabilizer kit according to claim 32, wherein the shedder is formed of aluminum plate material.

34. The tailgate stabilizer kit according to claim 30, wherein the cup forms a channel traversing a thickness of the mating gusset, and the tailgate stabilizer kit further comprises:
a cap to cover a forward opening of the channel opposite a rearward opening that receives the knob.

35. The tailgate stabilizer kit according to claim 30, wherein the knob has a conical shape, and the cup has a matching conical shape.

36. The tailgate stabilizer kit according to claim 30 further comprising a bolt of screw for mounting the knob to the tailgate.

37. The tailgate stabilizer kit according to claim 30, wherein the knob is formed of a resilient and compressible material.

\* \* \* \* \*